(12) United States Patent
de Vries

(10) Patent No.: US 6,433,444 B1
(45) Date of Patent: Aug. 13, 2002

(54) MODULAR FAULT TOLERANT POWER DISTRIBUTION SYSTEM

(75) Inventor: Thomas P. de Vries, Manassas, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/506,680

(22) Filed: Feb. 18, 2000

(51) Int. Cl.$^7$ .................................................. H02J 7/00
(52) U.S. Cl. ......................................................... 307/64
(58) Field of Search ............................. 307/61, 64, 65, 307/43, 77, 71

(56) References Cited

U.S. PATENT DOCUMENTS

| | | |
|---|---|---|
| 4,434,377 A | 2/1984 | Shima et al. |
| 4,659,942 A | 4/1987 | Volp |
| 5,053,637 A | 10/1991 | Dillard |
| 5,068,890 A | 11/1991 | Nilssen |
| 5,214,314 A | 5/1993 | Dillard et al. |
| 5,675,194 A | 10/1997 | Domigan |
| 5,726,507 A | 3/1998 | Tipton |
| 5,767,591 A | 6/1998 | Pinkerton |
| 5,786,642 A | 7/1998 | Wilhelm |
| 5,838,078 A | 11/1998 | Tipton |
| 5,847,921 A | 12/1998 | Kim |
| 5,964,609 A | 10/1999 | Wilson et al. |
| 5,994,794 A | 11/1999 | Wehrlen |

FOREIGN PATENT DOCUMENTS

| | | |
|---|---|---|
| EP | 0 150 853 | 8/1985 |
| EP | 1 006 641 | 7/2000 |
| WO | 99 60687 | 11/1999 |

OTHER PUBLICATIONS

Telephony, Digital Static Transfer Switch: UPS an downs, pp. 1–4 (Sep. 7, 1998).
The CYBERexpert, DSTS: Applications in Semiconductor Manufacturing, vol. 97, No. 5, pp. 1–2 (1997).
The CYBERexpert, DSTS: Applications in Data Centers, vol. 98, No. 9, pp. 1–6 (Nov. 1998).

*Primary Examiner*—Edward H. Tso
(74) *Attorney, Agent, or Firm*—Cantor Colburn LLP

(57) ABSTRACT

A modular power distribution system includes a three level approach to power distribution: a power module level, a transfer module level, and a distribution module level. At each level, the number of modules used can be varied based on the power requirements of the site. The power modules receive power from either a main, off-site generator (such as from an electric utility), or from an in-module backup generator. Additionally, the power, transfer, and distribution modules at each of the levels are arranged in a redundant topology, so that if any of the modules should fail, the remaining modules seamlessly assume the functions of the failing module.

16 Claims, 6 Drawing Sheets

MODULAR FAULT TOLERANT POWER DISTRIBUTION SYSTEM

BACKGROUND

1. Field

The present invention relates generally to power distribution systems and, more particularly, to fault tolerant power distribution systems capable of supporting critical loads with high power requirements.

2. Description of Related Art

The electrical power requirements of buildings housing large computer centers can be very high. The difficulty in efficiently supplying such buildings with adequate power is compounded when the computers are mission critical computers that must have a constant source of uninterrupted power.

Conventionally, mission critical computers are powered using the so-called uninterruptible power supply (UPS) power circuits. The UPS circuits monitor power flowing to the electrical loads (e.g., mission critical systems), and in the event of a power failure, seamlessly route power to the loads from a backup source such as a battery. From the point of view of the computers, power was never lost and they continue to operate as normal.

Supplying UPS power to high power consumption buildings can be a daunting task. Conventionally, such UPS solutions were individually designed and implemented at each site, resulting in a relatively expensive and time consuming design and engineering task. Additionally, maintenance of the power circuitry at each such site tends to require site-specific training, thus increasing cost.

Moreover, although UPS circuits effectively handle power disruptions leading to the site, the UPS circuit itself is still subject to failure. Accordingly, in order to increase the fault tolerance of a system, multiple redundant UPS systems were conventionally installed at a site. This type of redundancy, called system plus system redundancy, implements separate and parallel power systems and power pathways all the way through the site and leading to the loads. Although fault tolerant, these systems can be expensive as every part is duplicated for each level of redundancy.

Accordingly, thus is a need in the art for an improved UPS power solution at sites having high power requirements.

SUMMARY

Systems and methods are needed to address these needs as identified above.

One aspect of the present invention is directed to a multi-level modular power distribution system including a plurality of power modules, a plurality of transfer modules, and a plurality of power distribution modules. The power modules are each connected to receive power from an external source, the plurality of power modules including at least one alternate power module. Each of the transfer modules is associated with and connected to a corresponding one of power modules and to the at least one alternate power module. The power distribution modules receive power from the transfer modules and supply power to electrical loads of the power distribution system. When one of the power modules fails, the transfer module corresponding to the failing power module switches to power from the alternate power module.

A second aspect of the present invention is directed to a power module for supplying power in a modular power system. The power module comprises a temporary source of power; a petroleum powered backup generator; and an uninterruptible power supply (UPS). The UPS conditions power received from a main power supply and outputs the conditioned power. Further, the UPS receives power from the temporary source of power and the backup generator when the power from the main power supply fails.

Another aspect of the present invention is a method of supplying power to a building site. The method includes providing a predetermined number of power modules external to the building site, the predetermined number being at least equal to the total power requirement of the building site divided by two-thirds of the power capacity of the each power module. Further, each of the power modules is connected to associated transfer modules located within the building site. At least one of the power modules is designated as an alternate power module and connected to more than one of the transfer modules. The transfer modules are connected to distribution modules located proximate to the electric loads designated to use the supplied power.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

A modular and fault tolerant power distribution system has a three level structure: a power module level, a transfer module level, and a power distribution module level. The modules can be prefabricated at an assembly plant, shipped to the installation site, and then relatively easily installed at the installation site. At the site, the modules are connected by power and communication cables.

As will be described in more detail below, the present modular power system features double and triple redundancy in all systems and at all levels of power distribution. This redundancy allows concurrent maintenance operations and provides multi-level fault tolerance. While duplication of equipment is reduced relative to conventional system plus system implementations, the system reliability and availability is not affected by the economy.

Figure 1:
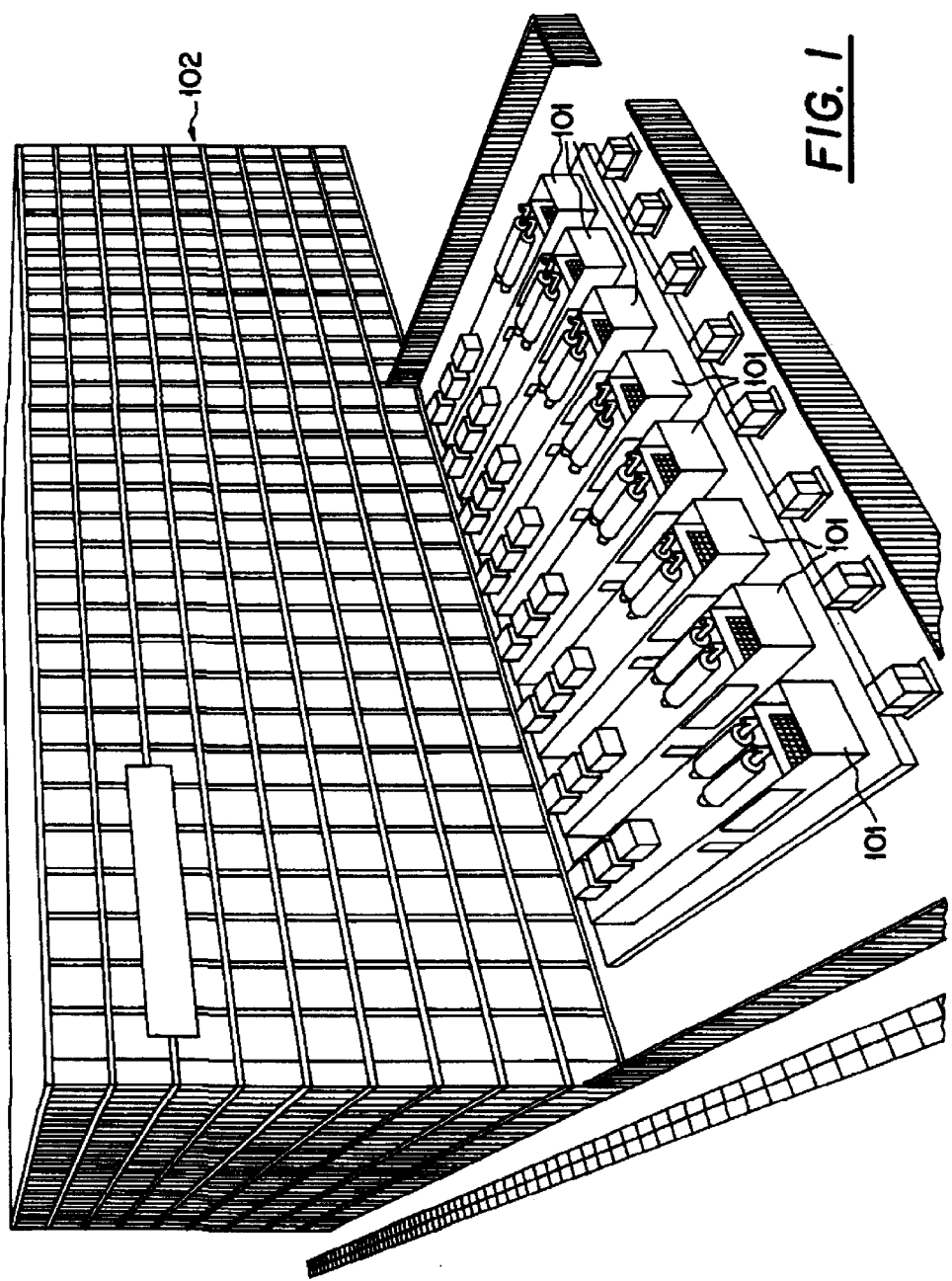
FIG. 1 is a perspective view illustrating an exemplary installation of a modular power distribution system at a target site.

FIG. 1 is a perspective view illustrating an exemplary installation of a modular power distribution system at a target site. Eight power modules 101 are shown outside of building 102. The power modules provide power to transfer and power distribution modules located inside the building 102.

The detailed electrical design and interconnection of each of the power, transfer, and distribution modules will now be described with reference to FIGS. 2–6.

Figure 2:
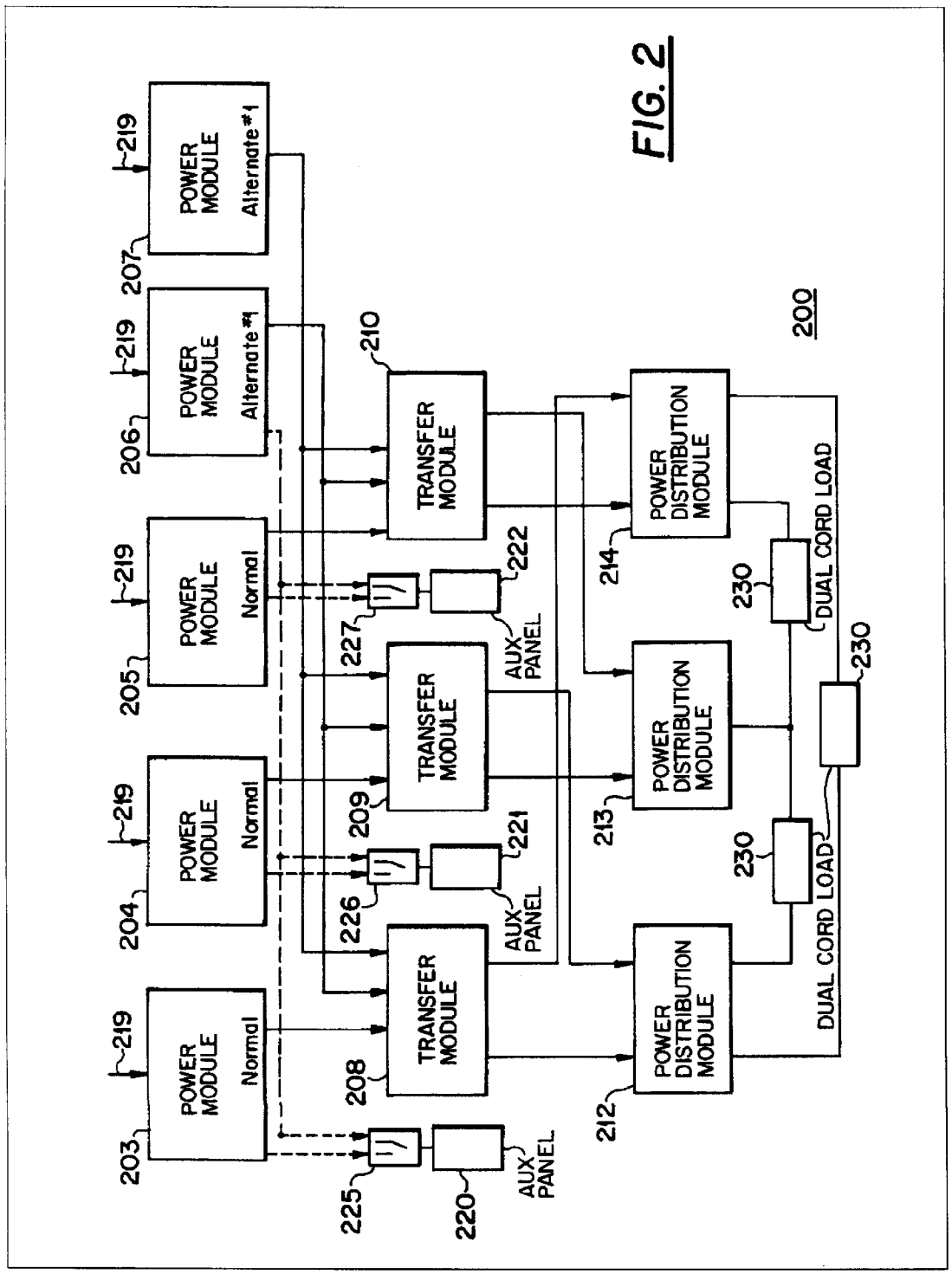
FIG. 2 is a high level block diagram illustrating an exemplary power distribution system having five power modules, three power transfer modules, and three distribution modules.

FIG. 2 is a high level block diagram illustrating a power distribution system having five power modules 203–207, three power transfer modules 208–210, and three distribution modules 212–214. Power is received at each of power modules 203–207 from main power lines 219 connected to a utility company or from backup generators disposed locally to each of power modules 203–207. In the power module arrangement illustrated, power modules 203, 204, and 205 are the "normal" power modules while power module 206 and 207 function as backup or alternate power modules. In normal operation, all the power requirements of the system are supplied by power modules 203–205. If one of power modules 203–205 fails, however, power from alternate power nodule 206 is seamlessly integrated by transfer modules 208–210 into the final power output of the system. If a second one of power modules 203–205, fails, or if alternate power module 206 fails, the second alternate power module, module 207, provides power for this failing module. Thus, at the power module level, system 200 is "N+2" redundant, meaning that there are two additional alternate power supplies that may be relied upon if anyone of the normal power modules fail.

For clarity, only one power distribution module 212 is shown in FIG. 2 for each transfer module 208. Typically, more than one power distribution module, such as three or four power distribution modules, will be installed per transfer module.

The number of modules to use at a particular site is determined by the power requirement and the amount of redundancy desired at the site. The minimum number of primary modules implemented at any particular site is preferably equal to the total power requirement divided by two-thirds of the power capacity of a single module (e.g., approximately 480 kVA in the illustrated sample system). The factor of two-thirds is used to calculate the minimum number of primary modules (as opposed to a factor of one) because the failure of one of transfer modules 208–210 (described in more detail below) requires that two other power modules carry their own loads plus 50% of the load normally carried by the failed transfer module.

Each of transfer modules 208–210 is associated with one of power modules 203–205 and with the alternate power modules 206 and 207. In normal operation, power from power module 203 is routed through transfer module 208 to power distribution modules 212 and 214. Similarly, power from power module 204 is routed through transfer module 209 to power distribution modules 212 and 213; and power from power module 205 is routed through transfer module 210 to power distribution modules 213 and 214. When one of power modules 203–205 fails, the transfer module associated with the failing power module routes power from alternate power modules 206 or 207 to its distribution modules. For example, if power module 205 fails, transfer module 210 routes power from alternate power module 206 to power distribution modules 213 and 214. Transfer modules 208–210 are normally installed inside the building.

As well as being redundant at the power module level, system 200 is redundant at the transfer module level. Specifically, because each distribution module receives power from two transfer modules, if any one of the transfer modules fails, all three distribution modules 212–214 can continue to receive power from one of the remaining two transfer modules.

Auxiliary panels 220–223 provide services such as lighting and HVAC (heating, ventilation, and air conditioning) to the building. Each auxiliary panel 220–223 is connected to two of the power modules 203–207. If power supplied from one of the power modules 203–207 fails, power from the panel's second power module is routed to the auxiliary panel through switches 225–227. For example, if the power being supplied from power module 203 to auxiliary panel 220 fails, switch 225 detects the power failure and switches to power module 204. Because power being supplied to auxiliary panels 220–223 can afford to be briefly interrupted without interfering with the effectiveness of the auxiliary panels, switches 225–227, as opposed to the internal sub-cycle switching occurring in transfer modules 208–210, may be simple mechanical power transfer switches.

As previously mentioned, each power distribution module 212–214 is redundantly supplied with power from two separate transfer modules 208–210. The power distribution modules supply power to their loads 230 (e.g., mission critical computer systems) through standard power distribution panels installed proximate to the distribution modules 212–214. Loads 230 are preferably dual cord loads, which allow them to redundantly receive power from two of the power distribution panels. Alternatively, each load 230 may be connected to a single power distribution module.

Figure 3:
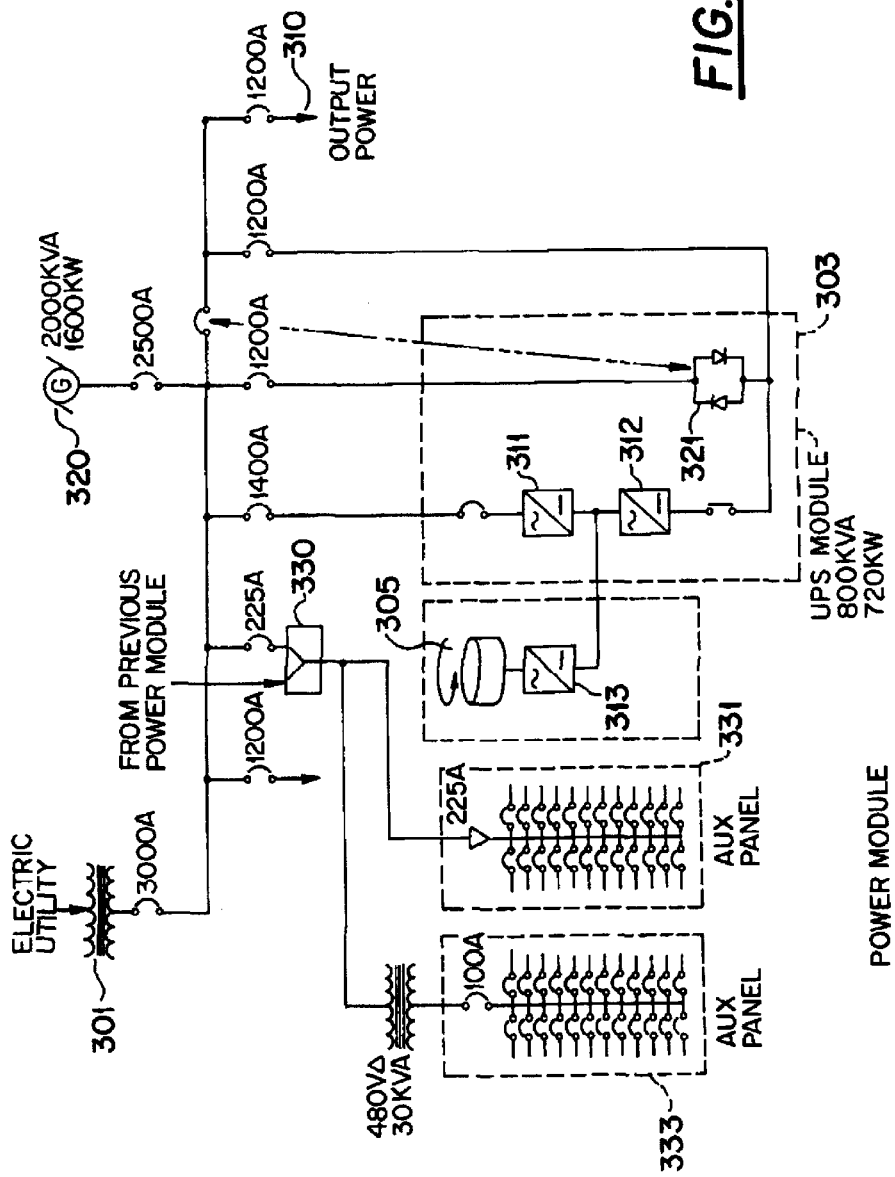
FIG. 3 is an electrical schematic diagram illustrating an exemplary embodiment of a power distribution module.

FIG. 3 is an electrical schematic diagram illustrating an exemplary embodiment of one of power distribution modules 203–206. A typical power module is designed to be able to source approximately 800 kVA (720 kW) to its transfer module. Accordingly, these modules tend to be relatively large (e.g., 60 feet by 12 feet), and are therefore designed to be located exterior to the facility. However, the power modules may also be supplied within a building, which may be advantageous in that weatherproofing and sound attenuating features may be omitted from the design of the power module.

The power distribution module is fed from a step-down transformer 301 connected to the local electric utility or to an alternate power supply. Preferably, transformer 301 converts the power supplied from the external source to a 2500 kVA, 480 volt, signal.

Automatic transfer switch 330 provides suitable power to 480-volt auxiliary panel 331, which provides lighting and HVAC services to the power module. A second 220/120 volt auxiliary panel 333 serves power module loads requiring 120-volt power. If power to auxiliary panels 331 and 333 fail, automatic transfer switch 330 transfers power to auxiliary panels 331 and 333 from one of the other power modules.

Power from transformer 301 is supplied to UPS (uninterruptible power supply) 303. UPS 303 provides clean power (i.e., power suitable for input to sensitive computer and electronic devices) and uninterrupted power to output line 310, which leads to the transfer modules and the building's auxiliary panels. Uninterruptible power refers to the UPS's ability to detect power failures from transformer 301 and immediately switch to backup power without any meaningful fluctuation in the power supply.

As shown in FIG. 3, UPS 303 contains a first power converter 311 for converting AC power to DC power and a second converter 312 that converts DC power to AC power. Input power is first converted by power converter 311 to DC power and then converted back to AC power by converter 312. With this dual power conversion scheme, UPS 303 conditions and removes noise from the output power supplied on line 310.

The DC power output from converter 311 is also input, after conversion to an AC signal by converter 313, to a flywheel 305, which provides short term backup power to UPS 303 in the event of a power failure of the power from transformer 301. Flywheel 305 stores energy as mechanical rotational energy. If power to UPS 303 is cut-off, the potential energy of the rotating flywheel is converted into electrical energy by converter 313 and transmitted back to UPS 303. UPS 303 uses the energy from flywheel 305 until a more permanent backup power source, such as power from a diesel generator, is brought on-line. Flywheels are well known in the art.

One of ordinary skill in the art will recognize that alternative methods, other than flywheel 305, can be used to supply short-term backup power to UPS 303, such as a battery storing energy as chemical potential energy.

Diesel generator 320 is a backup power supply to the main power supplied from the electric utility. A diesel engine generator control systems detect power failures from the main power supply, and in response, activates generator 320. The UPS then begins to draw power from flywheel 305 while generator 320 is coming on-line. UPS 303 monitors generator 320, and when it begins to supply stable power, switches from flywheel 305 to generator 320.

UPS 303 includes a static bypass switch 321 connected the main power and to generator 320. In the event of an internal failure of the UPS module, switch 321 turns on to isolate the power module. Static bypass switches are well known in the art.

Figure 4:
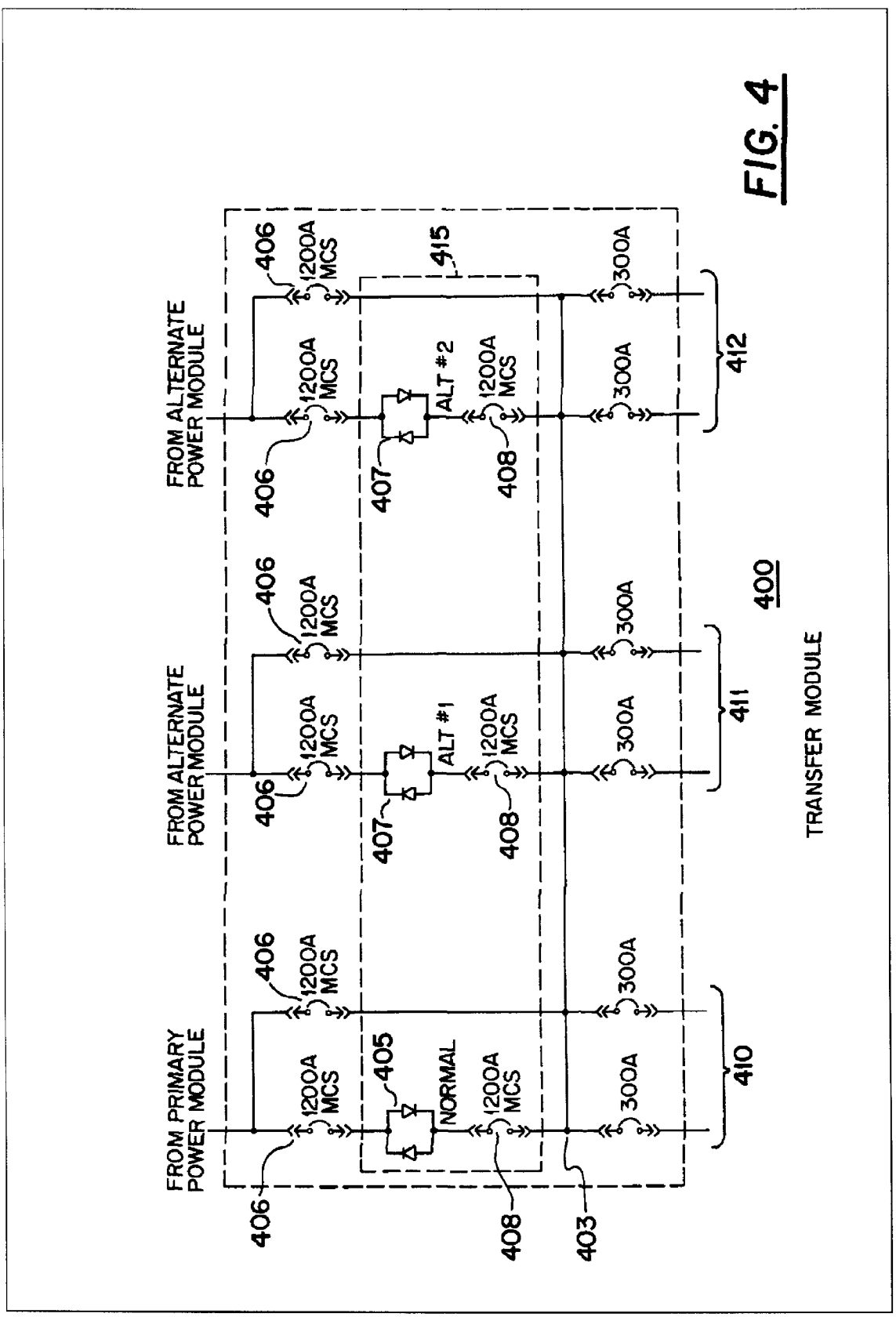
FIG. 4 is an electrical schematic diagram illustrating an exemplary embodiment of a power transfer module.

FIG. 4 is an electrical schematic diagram illustrating an exemplary embodiment of a power transfer module 400 designed to accept power from a primary power module and two alternate power modules.

Power transfer module 400 receives power from three sources—its primary power module and two alternate power modules. During normal operation, power is received at the primary power module input and routed through circuit breakers 406 and static bypass switch 405 to bus 403. Static bypass switches 407 isolate bus 403 from power being sourced by the alternate power modules. If the primary power module fails, static switch 405 detects the failure, and with circuit breakers 406, isolate bus 403 from the primary power module. In conjunction with this operation, one of static transfer switches 407, such as the one associated with the first alternate power source, begins to pass power from the alternate power source to bus 403. In a similar manner, if the first alternate power module fails, the static bypass switch 407 associated with the second alternate power module may transfer the power load to the second alternate power module.

Each of static switches 405 and 407 are associated with a circuit breaker 408. The combination of static bypass switches 405 and 407, and circuit breaker 408, functionally implement a single switch 415 having three inputs, one of which is output to bus 403. Switch 415 will be referred to as a "triple source static transfer switch."

Power transferred to bus 403 is forwarded to power distribution units through output ports 410–412. Two power lines lead out from each of output ports 410–412. These power lines are each connected to different power distribution units. In the example topography shown in FIG. 2, only one output port from each power transfer unit 208–210 is shown.

Although transfer module 400 is illustrated as containing connections for two alternate power sources, selectable through triple source transfer switch 415, a transfer module designed for more than two alternate power sources could be similarly constructed. By adding a third alternate power module and connecting the third alternate power module to each transfer module, an additional level of redundancy can be achieved.

The static switches (i.e., elements 405 and 407) in transfer module 400 preferably are capable of the following features: (1) preferred source selection, (2) undervoltage and single phase detection, (3) over current circuit detection, (4) transfer lockout, (5) retransfer time delay, (6) retransfer lock out, (7) control logic to allow selection and control of the automatic transfer switch, (8) operator interface controls and status indications, and (9) dry contacts for remote monitoring and control. Such transfer switches are commercially available from manufacturers such as United Power Corporation, of Richmond, Va.

Figure 5:
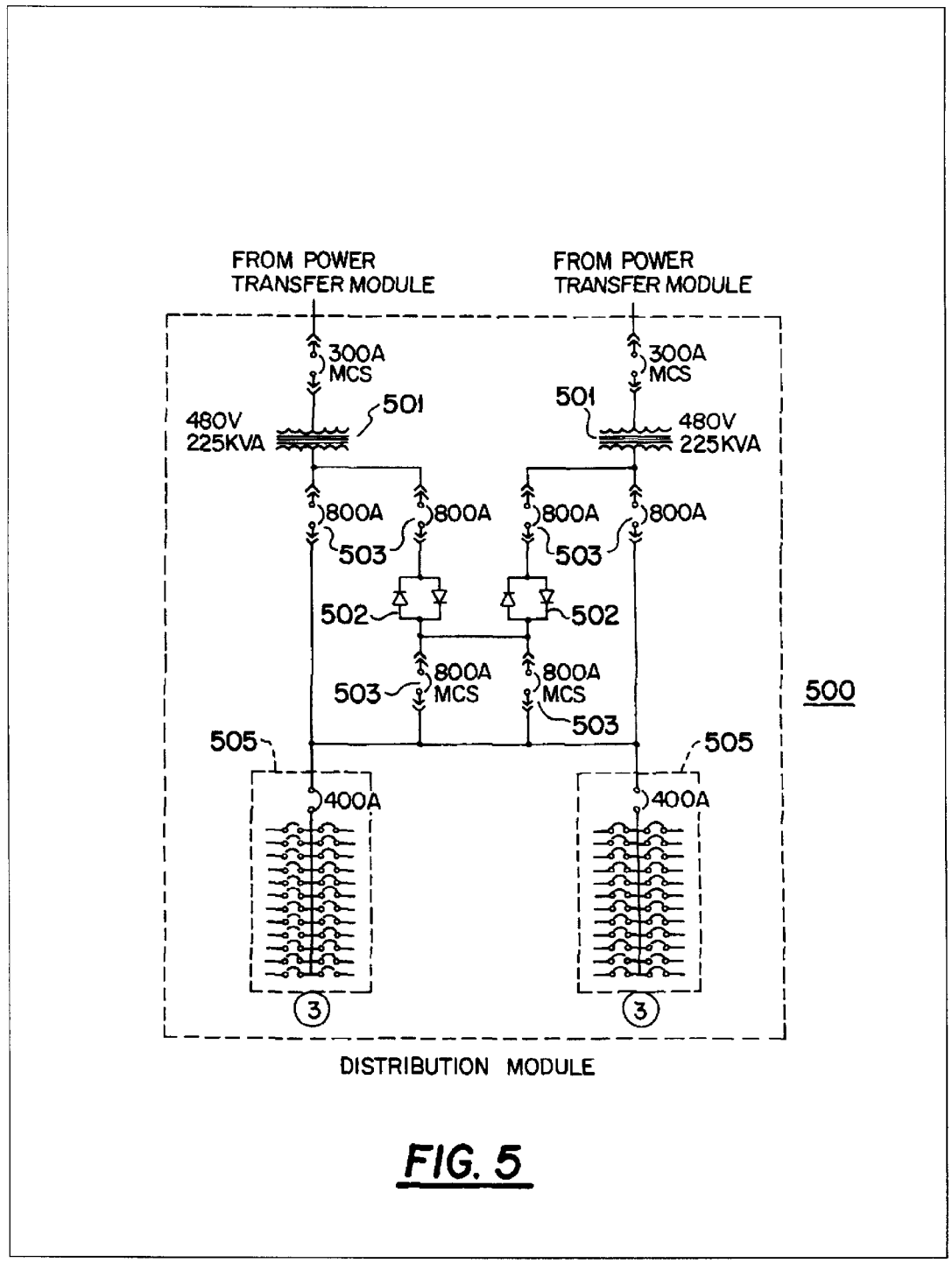
FIG. 5 is an electrical schematic diagram illustrating an exemplary embodiment of a power distribution module.

FIG. 5 is an electrical schematic diagram illustrating an exemplary embodiment of one of power distribution modules 212–214.

Power distribution module 500 is connected to two different power transfer modules. Power received from the power transfer modules is passed through a step-down transformer 501 before entering the parallel combination of static switches 502 and circuit breakers 503, which select whether or not power from their associated power transfer module is supplied to distribution panels 505. More particularly, static transfer switches 502 and circuit breakers 503 select power from one of the two input power sources. If the selected power source fails, the full load of the distribution module 500 is handled by the remaining input connection to the active power transfer module.

Distribution panels 505 are standard electrical power distribution panels to which the power cords leading to the intended loads are plugged in.

In order to reduce cost, the power, transfer, and distribution modules are preferably made from commercially available parts. One possible implementation for the main parts in the modules are as follows: power distribution panels 505, available from the General Electric Company; flywheel 305, available from Piller GmbH, of Germany; and generator 320, available from Detroit Diesel Corporation, of Michigan.

Figure 6:
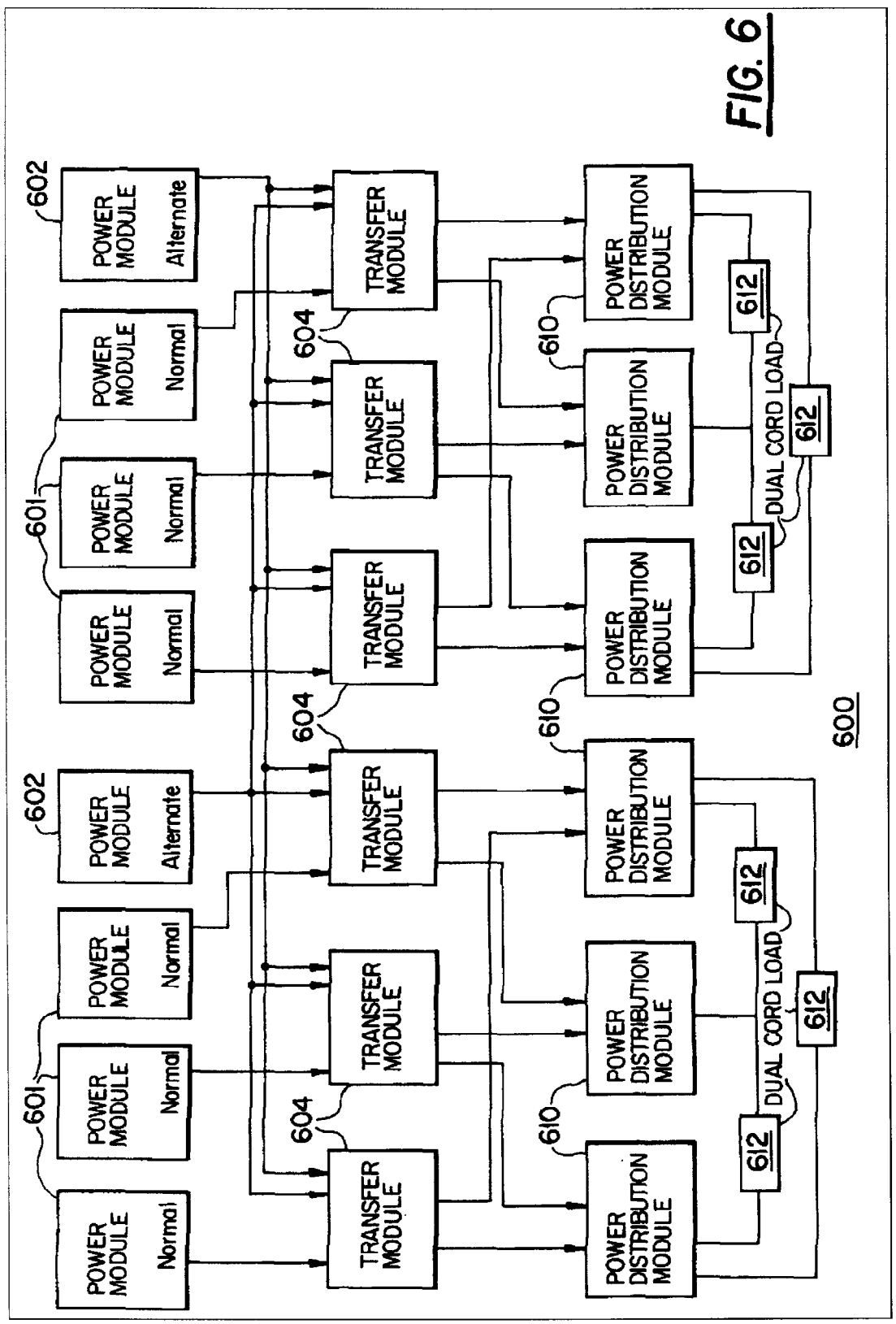
FIG. 6 is an electrical schematic diagram illustrating an embodiment of a modular power system having N+2 redundancy at the power module level.

FIG. 6 is an electrical schematic diagram illustrating an embodiment of a modular power system 600 having eight power modules and N+2 redundancy at the power module level. For clarity, connections to the auxiliary panels associated with the transfer level are not shown.

Power,distribution system 600 has eight power modules, six of which, labeled as modules 601, provide power to the transfer modules 604 during normal operation. Two alternate power modules 602 provide backup power to the transfer modules. If any one of power modules 601 fails, the transfer module being supplied by the failing power module detects the failure and switches to one of the two alternate power modules 602. Similarly, if a second power module 601 fails, the transfer module associated with this failing power module detects the failure and switches to the other of the alternate power modules 602.

As with the power distribution shown in FIG. 2, power distribution system 600 is also redundant at the transfer module level. Thus, if any one of transfer modules 604 fails, power is still sourced to its associated power distribution panel 610 using an alternate one of the transfer modules 604. Further, as with loads 230 shown in FIG. 2, loads 612 are preferably connected to two power distribution modules 610 using a dual cord connection.

System Operation

Each of the power modules, transfer modules, and distribution modules are connected together to form a networked power grid that can be monitored and controlled from a single location. Preferably, the network topology is distributed and redundant so that the failure of a single module will not interrupt communications among the remaining modules.

The above described power modules, transfer modules, and power distribution modules are preferably assembled, wired, and tested at a factory. This has the advantage of decreasing costs and allowing efficient implementation when the modules are delivered at the site. To shorten the power implementation even further, site preparation may take place before the equipment arrives. Because the modules are not site specific, they may be interchangeable between similar locations and similar facility designs.

It will be apparent to one of ordinary skill in the art that the embodiments described above may be implemented using many different combinations of electric components than those illustrated in the figures. The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A multi-level modular power distribution system, including:
   a plurality of power modules each connected to receive power from an external source, the plurality of power modules including at least one alternate power module;
   a plurality of transfer modules, each of the transfer modules associated with and connected to a corresponding one of the power modules, and each of the plurality of transfer modules connected to the at least one alternate power module; and
   a plurality of power distribution modules for receiving power from the transfer modules and supplying the power to electrical loads of the power distribution system;
   wherein when one of the power modules fails, the transfer module corresponding to the failing power module switches to power from the alternate power module.

2. The system of claim 1, wherein the plurality of power modules includes at least two alternate power modules, each of the two alternate power modules being connected to each of the plurality of transfer modules.

3. The system of claim 1, further including auxiliary panels for providing air conditioning services, the auxiliary panels each connected to at least two of the power modules so that if one of the power modules fails the auxiliary panel will draw power from the other of the two power modules.

4. The system of claim 1, wherein each of the power modules further include:
   a temporary backup power source;
   a backup generator; and
   an uninterruptible power supply (UPS) circuit that receives backup power from the temporary backup power source and from the backup generator, the UPS circuit switching to power from the temporary backup power source and from the generator when power from the external source fails.

5. The system of claim 4, wherein the UPS circuit detects failure of the external power source and transfers the output power from the external power source to the power supplied by the temporary backup power source and the backup generator.

6. The system of claim 5, wherein the temporary backup power source is a flywheel.

7. The system of claim 5, wherein the backup generator is a diesel generator.

8. The system of claim 1, wherein the power modules each source approximately 750 kVA of power.

9. The system of claim 1, wherein the power distribution modules are each connected to at least two of the transfer modules, such that if one of the two transfer modules fail, the power distribution module begins to draw power from the remaining transfer module.

10. The system of claim 1, wherein the transfer modules each further include a triple source transfer switch connected to three of the plurality of power modules, the triple source transfer switch transferring power from one of the three power modules to at least one power distribution module.

11. A power module for supplying power in a modular power system, the power module comprising:
    a temporary source of power;
    a petroleum powered backup generator; and
    an uninterruptible power supply (UPS) for conditioning power received from a main power supply and outputting the conditioned power, the UPS receiving power from the temporary source of power and the backup generator when the power from the main power supply fails; wherein
    the power module is a standard power module capable of being installed in parallel with a number of other similar power modules to meet the power requirements of a site.

12. The power module of claim 11, wherein the temporary source of power is a flywheel generator.

13. The power module of claim 11, wherein the main power supply is an electric utility.

14. The system of claim 10, wherein the power module sources approximately 750 kVa of power.

15. A method of supplying power to a building site comprising:
    providing a predetermined number of power modules external to the building site, the predetermined number being at least equal to the total power requirement of the building site divided by two-thirds of the power capacity of the each power module;
    connecting each of the power modules to associated transfer modules located within the building site, at least one of the power modules being designated as an alternate power module and connected to more than one of the transfer modules; and
    connecting the transfer modules to distribution modules located proximate to the electric loads designated to use the supplied power.

16. The method of claim 15, wherein the electric loads are mission critical computer systems.

* * * * *